(No Model.)
A. T. CLASON.
MACHINE FOR FELTING HATS.
No. 338,140. Patented Mar. 16, 1886.
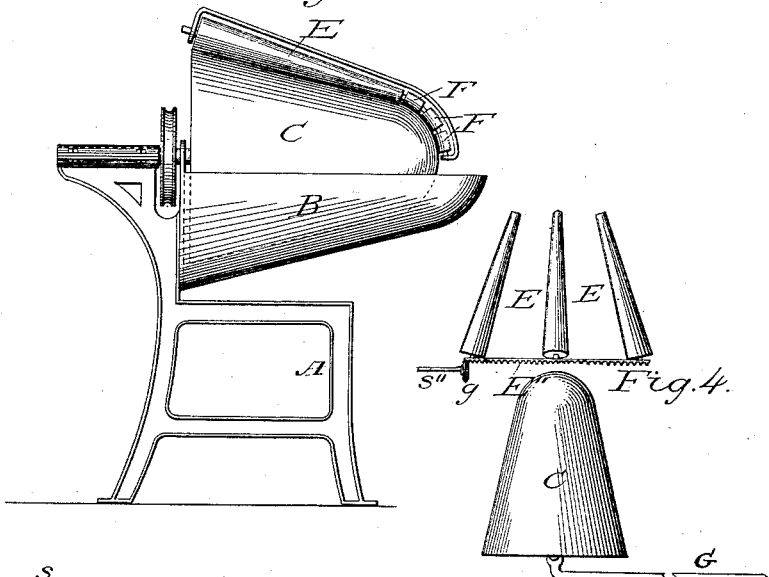
Fig. 1.
Fig. 4.
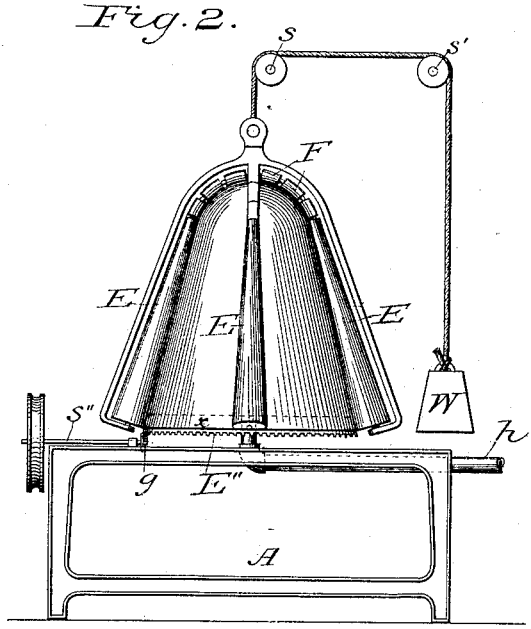
Fig. 2.
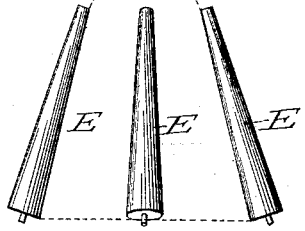
Fig. 3.
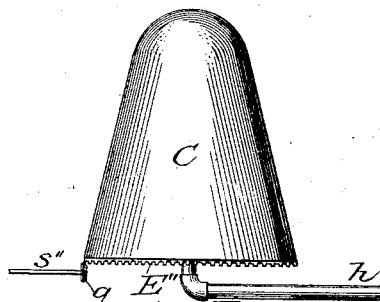
Witnesses:
James S Taylor
Herman Print
Inventor:
Abraham T. Clason,
W. J. Howard
attorneys.

UNITED STATES PATENT OFFICE.

ABRAHAM T. CLASON, OF DANBURY, CONNECTICUT.

MACHINE FOR FELTING HATS.

SPECIFICATION forming part of Letters Patent No. 338,140, dated March 16, 1886.

Application filed February 26, 1884. Serial No. 122,127. (No model.)

*To all whom it may concern:*

Be it known that I, ABRAHAM T. CLASON, of Danbury, in the county of Fairfield and State of Connecticut, have invented certain new and useful Improvements in Machinery for Felting Hats; and I do hereby declare the following to be a full, clear, and exact description of the same.

This invention relates to improvements in hat-felting machinery, whereby the hats are placed over a conical form corresponding to the shape of the hat, and felted thereon by means of rollers applied to the outer surface thereof, suitable mechanism being employed for giving the same a rotating or revolving motion, as fully set forth in the following specification and accompanying drawings, in which—

Figure 1 is a side elevation of one form of the invention. Fig. 2 is a similar view of a modified form of the invention. Fig. 3 represents views of detached details comprised in Fig. 2. Fig. 4 shows a further modification.

Similar letters of reference indicate similar parts in the respective figures.

Referring particularly to Fig. 1, A represents the frame, to which is attached a vat or tub, B, for holding hot water.

C is a cone, either solid or perforated, of metal, wood, or other suitable material.

E is a conical roller, so constructed and adjusted as to impinge against the cone C in the line of longitudinal centers.

F F represent adjustable concave rollers made to agree with the circular form of the end of the cone C.

The cone C and roller E are attached to the frame A by means of ordinary bearings, and geared so as to revolve together, whereby friction between the two surfaces is avoided.

The cone C is so adjusted that its lower portion revolves in the water contained in the vat B.

A reciprocating motion is communicated to the rollers or workers E and F in the longitudinal direction by mechanism usually employed for that purpose. The rollers or workers E F may be duplicated, or three or more used conjointly to exert an increased felting action upon the hats.

In the arrangement shown in Fig. 1 the cone C is placed in a horizontal position. It may, however, be operated in a position having its longitudinal center line in nearly or quite a perpendicular position, as represented in Fig. 2, which shows a solid cone. A pipe, *h*, admits steam to the chamber *x*, formed at the base of the cone. The workers or felters are here represented as balanced, for the purpose of adjustment and removal, by means of pulleys *s s'* and a weight, *w*.

In operating the machine the hats to be felted, being conical in form, are opened and placed upon the cone C, so as to cover the same as a hood. The rollers or felters E F are then caused to impinge against the outer surface of the hat. Motion being communicated to the cone C, it is caused to revolve in the vat, saturating one portion of the hat, while another portion thereof is passed under the workers or rollers E F, which press out the water. The rollers or felters E F may be caused to revolve wholly by frictional contact with the hat. The reciprocating motion given to the rollers E F in a longitudinal direction causes the fibers of the hats to be rapidly united. To prevent injury to the hats, I usually cover the cone C with an elastic material, as linen, wool, or rubber, and also cover the outer surface of said hat-body with a hood of cloth or pliable material, so that the rollers E F will not injure or displace the fibers.

A further modification of this invention is illustrated in Fig. 4. The small rollers E are suspended in a revolving frame, (not shown,) but which may be similar to that illustrated in Fig. 2, except that it has a geared ring, E″, at its base. Motion is communicated to the rollers or workers E by means of the shaft *s″* and gear *g*. The hat-body having been placed upon the cone C, the cone is forced upward by means of the lever G into the chamber formed by the rollers E. The pressure of the cone C, with the hat thereon, against the surfaces of the rollers E, causes the rollers to rotate over the surface of the hat.

Having thus described my invention, I claim as as new—

1. In a hat-felting machine, the combination of a cone adapted to be heated and conforming to the shape of the hats, combined with a series of workers or rollers, E F, the rollers F being made to curve over the spherical end of the cone, substantially as set forth.

2. In a hat-felting machine, the combination of a cone adapted to be heated and conforming to the shape of the hats, a vat, and a series of workers or rollers, E F, the rollers F being made to curve over the spherical end of the cone, substantially as set forth.

ABRAHAM T. CLASON.

Witnesses:
JAMES S. TAYLOR,
WILLIAM T. ST. JOHN.